UNITED STATES PATENT OFFICE.

EDWARD BROEMME, OF ST. PETERSBURG, RUSSIA, ASSIGNOR OF ONE-HALF TO CHARLES DENEYS, OF SAME PLACE.

PROCESS OF PRODUCING LAKES.

SPECIFICATION forming part of Letters Patent No. 560,890, dated May 26, 1896.

Application filed September 16, 1895. Serial No. 562,699. (Specimens.)

*To all whom it may concern:*

Be it known that I, EDWARD BROEMME, a citizen of the Republic of Switzerland, residing in St. Petersburg, in the Empire of Russia, have invented certain new and useful Improvements in Processes of Producing Dyestuff-Lakes, of which the following is a specification.

The best dyestuff-lakes which are used in the manufacture of wall and colored papers were heretofore obtained by the precipitation of soluble dyestuffs on a white body, and more especially by the addition of dissolved barium chlorid to a solution of the dyestuff and sodium carbonate. The barium carbonate obtained by the reaction binds the dyestuff and retains the same on the surface on which it is precipitated. The dyestuff-lake thus obtained is well known in the manufacture of wall and colored papers by its good spreading power and soft appearance. I have discovered that when the barium salt is replaced in this manufacture by a soluble strontium salt a special and superior effect is obtained, inasmuch as the dyestuff-lakes produced in this manner have a specially bright appearance and are characterized by extra fine shades.

Another advantage of this process of making dyestuff-lakes consists in the fact that these lakes produce very strong color effects and require a considerably smaller quantity of dyestuff in producing the same quantity, by weight, of lakes of the same shade, as in the manufacture with barium chlorid as heretofore practiced. When in place of sodium carbonate sodium sulfate is used, then all the lakes which are obtained on the strontium sulfate have a very intense blue color in the same manner as lakes which are obtained on barium sulfate, (blanc fixe,) which are also considerably bluer than those produced with barium carbonate. The commercial tar-dyes, as well as various natural dyes, were carefully tested by me, and I found that the greater part of the same can be used with advantage in the form of strontium lakes.

I have obtained very fine orange and yellowish up to bright bluish-red color-shades from azo dyestuffs obtained from diazobenzenchlorid and its homologues and sulfo-acids with the napthols and their sulfo-acids, (orange II, crocein-orange, ponceau G, R, 2R, 3R, &c.,) while from alpha and beta diazonaphtylchlorid and their sulfo-acids with naphthols and their sulfo-acids bluish red and brown color-shades, (genuine red A, B, C, D, E, BT, &c., Bordeaux S and R, amaranth, genuine brown O and N, &c.,) are obtained; also from tetrazo-dyestuffs obtained from tetrazo-diphenylchlorid and its homologues with naphtylamin and naphthol sulfo-acids and salicylic acid reddish-brown, respectively, blue and yellow shades, (benzopurpurin B, 4B, 10B, &c., chrysamin, &c.,) and from tartrazin yellow, and from the natural dyestuff flavin, beautiful yellow-brownish shades.

I have further tested tar dyestuffs which are not in the market, and especially azo dyestuffs, as to their adaptation for lakes, and I have discovered that especially useful results were obtained with the dyestuff obtained from diazobenzol chlorid and sodium sulfanilate (yellowish shades) and sodium naphthionate.

The production of the dyestuff can also be with advantage coupled with the simultaneous production of the dyestuff-lake, when a cold diazo solution is mixed with the required quantity of strontium chlorid, and when for the alkaline solution of the phenol, respectively naphthol, their sulfo or carbon acid or amidosulfo-acid, a sufficient quantity of a solution of sodium carbonate is added that not only the azo dyestuff is formed, but also strontium is completely precipitated.

The maroon, geranium, and other lakes which are favorite shades in the wall-paper manufacture can be produced in specially bright shades partly by pure lakes of Bordeaux S or R, but more especially by the successive coloration of the bright-red lakes obtained from the ponceaus with other tar colors, such as fuchsin-violet, which can be shaded off by the addition of tannic acid. Basic dyestuffs can also be used by the coloration of the previously-formed strontium carbonate with a solution of the dyestuff and by the successive precipitation of the dyestuff with tannic acid.

Example I: One part by weight of ponceau R is dissolved in two hundred parts of water, to which solution a solution of seven parts of sodium carbonate in water is added, after which one part of aluminium sulfate (free of iron) in solution is added. To this solution strontium chlorid is added under constant stirring until the dyestuff is precipitated, for which purpose fifty parts by weight of a solution of strontium chlorid of 28° Baumé is sufficient. For these applications a solution of crude strontium chlorid, obtained from the strontionite of commerce by neutralizing with diluted hydrochloric acid, can be employed. The so-obtained dyestuff-lake is filtered in a filter-press and used as a paste, or it is dried at moderate temperature, ground, and screened. Two parts by weight of finely-ground feldspar, which is passed with water through a fine screen, can be added to the dyestuff-lake solution before precipitation without changing in the least the shade and softness of the color.

Example II: Twelve parts by weight of xylidin are dissolved in twenty-seven parts of hydrochloric acid of 20° Baumé and one thousand parts of water and are then diazotized under addition of ice with a solution of seven parts by weight of nitrite in water. To this diazo solution are added three thousand parts by weight of a solution of strontium chlorid of 27° Baumé under constant stirring, after which the mixture is poured into a solution of forty parts of sodium beta-naphthol disulfonate (R salt) and four hundred and thirty parts of sodium carbonate in five thousand parts of water. The dyestuff-lake thus obtained is filtered and treated as before stated.

Having thus described my invention, I claim as new and desire to secure by Letters Patent—

1. The process herein described of making dyestuff-lakes, which consists in precipitating the dyestuff by a solution of a sodium salt and a soluble strontium salt, so as to form the lake of said dyestuff, substantially as set forth.

2. The process herein described of making dyestuff-lakes, which consists in precipitating the dyestuff with a solution of sodium carbonate and a soluble strontium salt until strontium carbonate is obtained, substantially as set forth.

3. The process herein described of producing dyestuff-lakes from the acid tar-dyes, which consists in precipitating one of said dyestuffs with a strontium salt so as to form the lake of said dyestuff, substantially as set forth.

4. The process herein described of producing the azo dyestuff simultaneously with strontium carbonate, which consists in diazotizing the azo dyestuff, precipitating with a soluble strontium salt and producing the required dye under simultaneous formation of the lake of said dye, substantially as set forth.

In testimony that I claim the foregoing as my invention I have signed my name in presence of two subscribing witnesses.

EDWARD BROEMME.

Witnesses:
ED. VONE,
M. DIXON.